(12) United States Patent
Xing

(10) Patent No.: US 8,810,580 B2
(45) Date of Patent: Aug. 19, 2014

(54) METHOD AND TOOL FOR CREATING IRREGULAR-SHAPED TABLES

(75) Inventor: Zhaohui Xing, Calgary (CA)

(73) Assignee: SMART Technologies ULC (CA)

( * ) Notice: Subject to any disclaimer, the term of this patent is extended or adjusted under 35 U.S.C. 154(b) by 451 days.

(21) Appl. No.: 12/271,204

(22) Filed: Nov. 14, 2008

(65) Prior Publication Data

US 2010/0123719 A1 May 20, 2010

(51) Int. Cl.
*G06T 11/20* (2006.01)
*G06K 9/00* (2006.01)
*G06K 9/18* (2006.01)

(52) U.S. Cl.
USPC ............ 345/443; 382/181; 382/151; 382/186

(58) Field of Classification Search
USPC ......................................................... 345/443
See application file for complete search history.

(56) References Cited

U.S. PATENT DOCUMENTS

| | | | |
|---|---|---|---|
| 7,412,094 B2 * | 8/2008 | Chen et al. | 382/181 |
| 2006/0061776 A1 * | 3/2006 | Chen et al. | 358/1.1 |

OTHER PUBLICATIONS

Walter Glenn, "Word 2000 in a Nutshell," O'Reilly Media, 1st Edition Aug. 2000. p. 13 and Chapter 10.*
"Connected Components" http://www.cse.unr.edu/~bebis/CS791E/Notes/ConnectedComponents.pdf Archived on Feb. 28, 2005. Retrieved on Dec. 8, 2011 from <http://wayback.archive.org/web/20050301000000*/http://www.cse.unr.edu/~bebis/CS791E/Notes/ConnectedComponents.pdf>.*
"Enable/disable table cell editable dynamically" http://www.coderanch.com/t/335110/GUI/java/Enable-disable-table-cell-editable. Posted on Jan. 24, 2003. Retrieved on Aug. 10, 2012.*
"Drawing Custom Tables in Microsoft Word 2007" http://www.brighthub.com/computing/windows-platform/articles/11468.aspx. Archived on Oct. 3, 2008. Retrieved on Feb. 21, 2013 from <http://web.archive.org/web/20081020054701/http://www.brighthub.com/computing/windows-platform/articles/11468.aspx>.*
Joyce, Jerry, and Marianne Moon. Microsoft® Office Word 2007 Plain & Simple. Microsoft Press, 2007.*

* cited by examiner

*Primary Examiner* — Kee M Tung
*Assistant Examiner* — Zhengxi Liu
(74) *Attorney, Agent, or Firm* — Katten Muchin Rosenman LLP

(57) ABSTRACT

A computerized method of creating an irregular-shaped table of cells comprises detecting one or more cells of a table to be removed, removing each detected cell from the table and creating a table object representing the resultant irregular-shaped table.

15 Claims, 17 Drawing Sheets

FIG. 3A

|   | A | B | C | D | E | F | G | H |
|---|---|---|---|---|---|---|---|---|
| B | 1 | 80 | 92 | 22 | 1 | 3 | 120 | |
| C | 103 | 55 | 57 | 31 | 111 | 10 | | |
| D | 23 | 89 | 21 | 10 | 11 | | | |
| E | 0 | 8 | 12 | 13 | | | | |
| F | 12 | 25 | 2 | | | | | |
| G | 30 | 32 | | | | | | |
| H | 96 | | | | | | | |

METHOD AND TOOL FOR CREATING IRREGULAR-SHAPED TABLES

RELATED APPLICATIONS

This application is related to U.S. patent application Ser. No. 12/058,234 to Zhaohui Xing filed on Mar. 28, 2008 entitled "Method and Tool for Recognizing a Hand-Drawn Table" and to U.S. CIP patent application Ser. No. 12/203,605 filed on Sep. 3, 2008 entitled "Method and Tool for Recognizing a Hand-Drawn Table". The contents of these related applications are incorporated by reference herein in their entirety.

FIELD OF THE INVENTION

The present invention relates generally to digital ink processing and in particular, to a method and tool for creating irregular-shaped tables.

BACKGROUND OF THE INVENTION

Interactive input systems that allow users to inject input (eg. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated herein by reference; touch systems comprising touch panels employing electromagnetic, capacitive, acoustic or other technologies to register pointer input; tablet personal computers (PCs); touch-enabled laptop PCs; personal digital assistants (PDAs); and other similar devices. Although these interactive input systems are able to recognize handwriting well, their ability to recognize and represent the meaning and context of hand-drawn objects and in particular, charts or tables, has been limited.

Microsoft Office™ software includes a feature that enables tables to be created by moving a cursor over an open document. During table creation, cursor movements over the open document are translated immediately into one of rectangles, squares and straight lines. In certain environments, creating irregular-shaped tables is highly desirable. Unfortunately, although the Microsoft Office software allows tables to be created, the shapes of created tables are limited to rectangles and squares. As will be appreciated, improvements in table creation are desired.

It is therefore an object of the present invention to provide a novel method and tool for creating irregular-shaped tables.

SUMMARY OF THE INVENTION

Accordingly, in one aspect there is provided a computerized method of creating an irregular-shaped table of cells comprising:
 detecting one or more cells of a table to be removed;
 removing each detected cell from said table; and
 creating a table object representing the resultant irregular-shaped table.

According to another aspect there is provided a computer readable medium embodying computer program code for creating an irregular-shaped table of cells, said computer program code comprising:
 program code for detecting one or more cells of a table to be removed;
 program code for removing each detected cell from said table; and
 program code for creating a table object representing the resultant irregular-shaped table.

BRIEF DESCRIPTION OF THE DRAWINGS

Embodiments will now be described more fully with reference to the accompanying drawings in which:

FIGS. 3a to 3c show created irregular-shaped tables;

FIGS. 8a to 8c show examples of the neighboring cells of a cell;

DETAILED DESCRIPTION OF THE EMBODIMENTS

In the following, a method and tool for creating irregular-shaped tables is described. The tool is preferably implemented in software, which when executed by a processing device allows a regular-shaped table to be transformed into an irregular-shaped table and a resulting table object created representing the irregular-shaped table. The software tool also allows an irregular-shaped table to be transformed into an alternatively shaped table and a resulting table object created representing the alternatively shaped table. Each created table object is compatible with conventional word processing software such as for example Microsoft Word™.

For the purposes of the following, it will be understood that a regular-shaped table is one that is in the shape of a rectangle or a square, and is filled completely with cells. Thus, one example of an irregular-shaped table is one in the shape of a square or a rectangle, but is not completely filled with cells. Another example of an irregular-shaped table is one that is in the shape of something other than a rectangle or square. Such an irregular-shaped table may be either completely or incompletely filled with cells.

Figure 1:
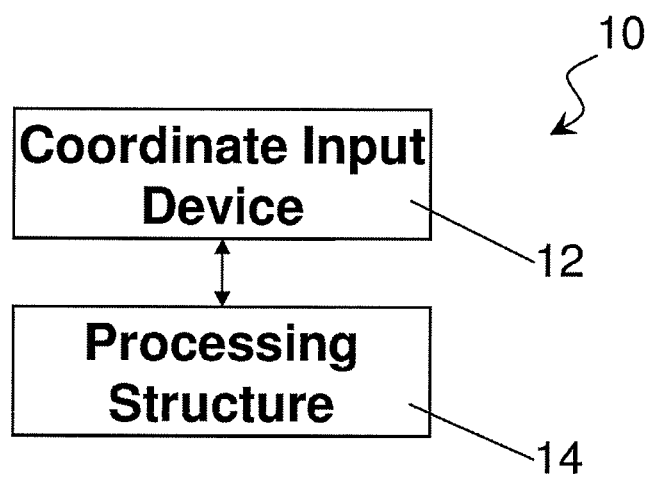
FIG. 1 is a block diagram of an interactive input system.

Turning now to FIG. 1, a block diagram of an interactive input system is shown and is generally identified by reference numeral 10. Interactive input system 10 comprises a coordinate input device 12 such as for example a touch panel on which pointer contacts can be made. The coordinate input device 12 communicates with processing structure 14 executing one or more application programs. Image data generated by the processing structure 14 is displayed on the display surface of the coordinate input device 12 allowing a user to interact with the displayed image via pointer contacts on the coordinate input device 12. The processing structure 14 interprets pointer contacts as input to the running application program and updates the image data accordingly so that the image displayed on the display surface reflects the pointer activity. In this manner, the coordinate input device 12 and processing structure 14 form a closed loop allowing pointer interactions with the coordinate input device 12 to be recorded as handwriting or drawing or used to control execution of the application program. The coordinate input device 12 of the interactive input system 10 may be separate from the processing structure 14 as is shown in the above-incorporated patents assigned to SMART Technologies ULC of Calgary, Alberta, Canada, or may be combined with the processing structure 14 to form an integral compact unit as in the case of personal computers (PCs), tablet PCs, laptop PCs, personal digital assistants (PDAs), cellular telephones or other suitable devices.

The processing structure 14 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit. It will be understood that the computer may also include a subsystem for communicating with other computers such as that which employs Ethernet, WiFi, or some other network communications format.

The processing structure 14 runs a host software application such as SMART Notebook™ offered by SMART Technologies ULC of Calgary, Alberta, Canada. As is known, during execution, the SMART Notebook™ application provides a graphical user interface comprising a canvas page or palette, that is presented on the display surface of the coordinate input device 12 on which freeform or handwritten ink objects together with other computer generated objects can be input and manipulated via pointer interaction with the coordinate input device 12. The SMART Notebook™ application, in this embodiment, is provided with a tool for creating irregular-shaped tables.

Figure 2A:
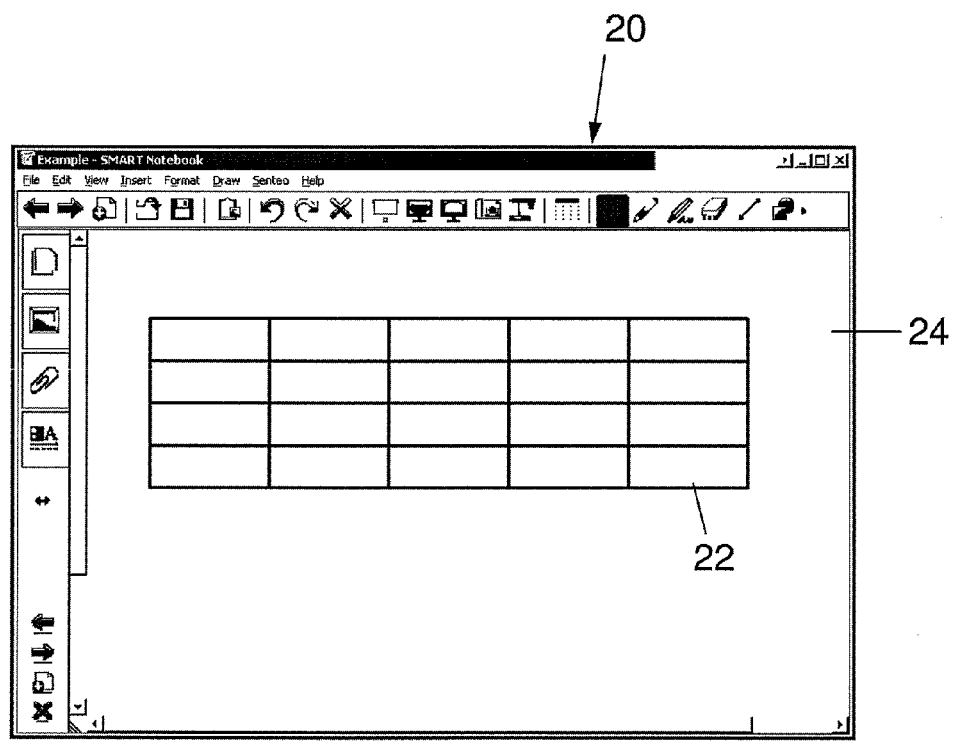
FIGS. 2a to 2c show a graphical user interface presented on the display surface of a coordinate input device during irregular-shaped table creation.
Figure 2B:
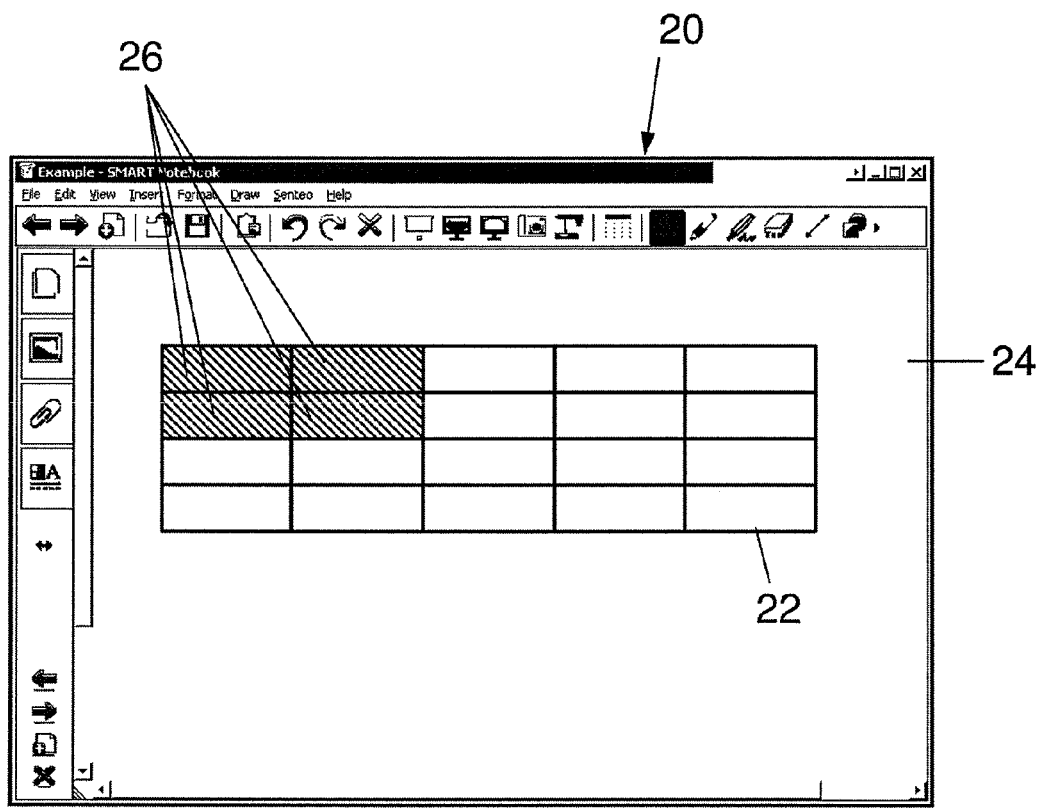

FIGS. 2a and 2b show the graphical user interface 20 presented on the display surface of the coordinate input device 12. In FIG. 2a, a rectangular regular-shaped table 22 has been input on the canvas page 24 of the graphical user interface 20 through use of conventional software having a table creation feature. In FIG. 2b, a number of cells 26 of the rectangular regular-shaped table 22 have been selected as shown by the highlighting, which makes the selected cells 26 visually distinct from those that are unselected. In this example, the selected highlighted cells 26 are all connected and form a single group of highlighted cells 26. However, it will be understood that the selected highlighted cells may form different groups of one or more highlighted cells 26.

Figure 2C:
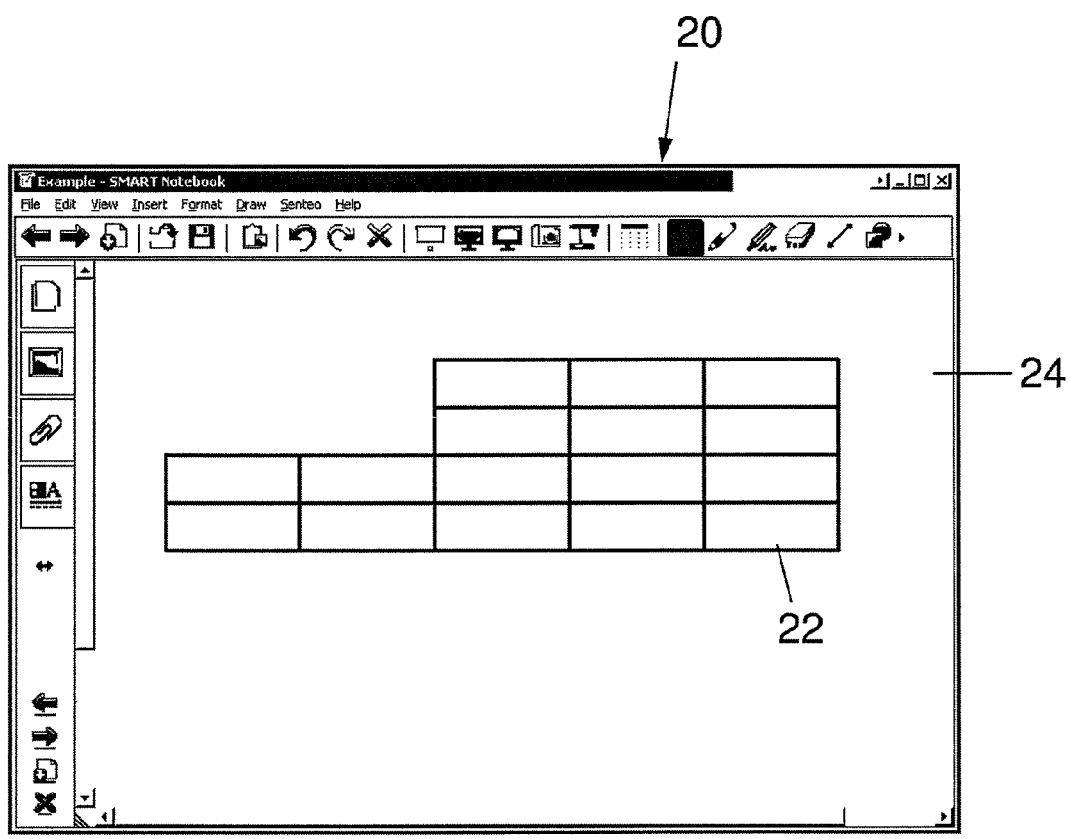

After the desired cells of the rectangular table 22 have been selected, the tool for creating irregular-shaped tables is invoked through selection of a displayed icon or a pop-up menu item. Once the tool for creating irregular-shaped tables is invoked, the tool removes the selected cells 26 of the table 22 resulting in an irregular-shaped table as shown in FIG. 2c.

Figure 3A:
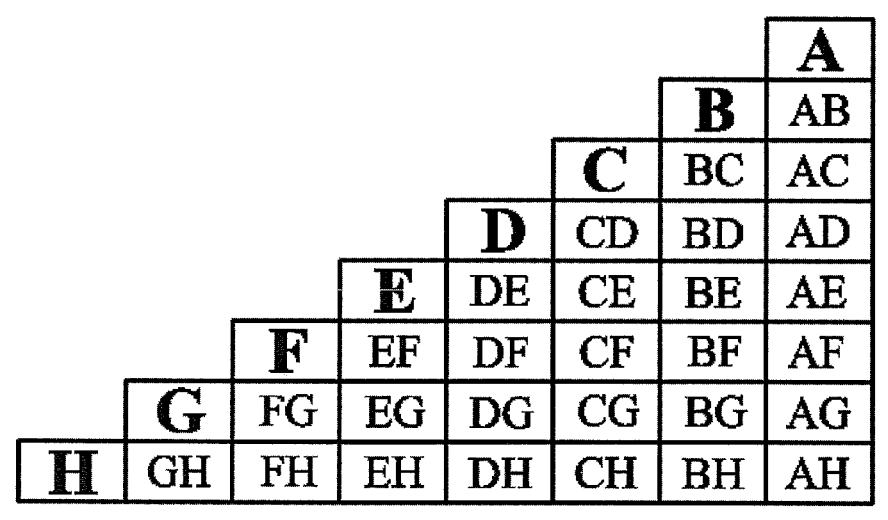
Figure 3C:
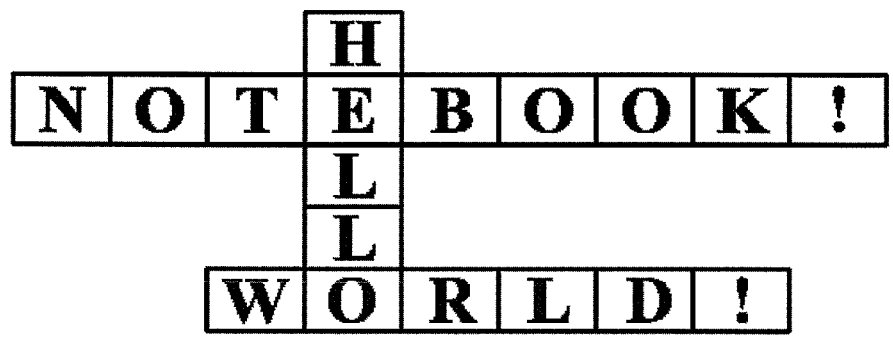

FIGS. 3a to 3c show alternative irregular-shaped tables generated by the tool. In these examples, content objects populate the cells of the irregular-shaped tables.

Figure 4:
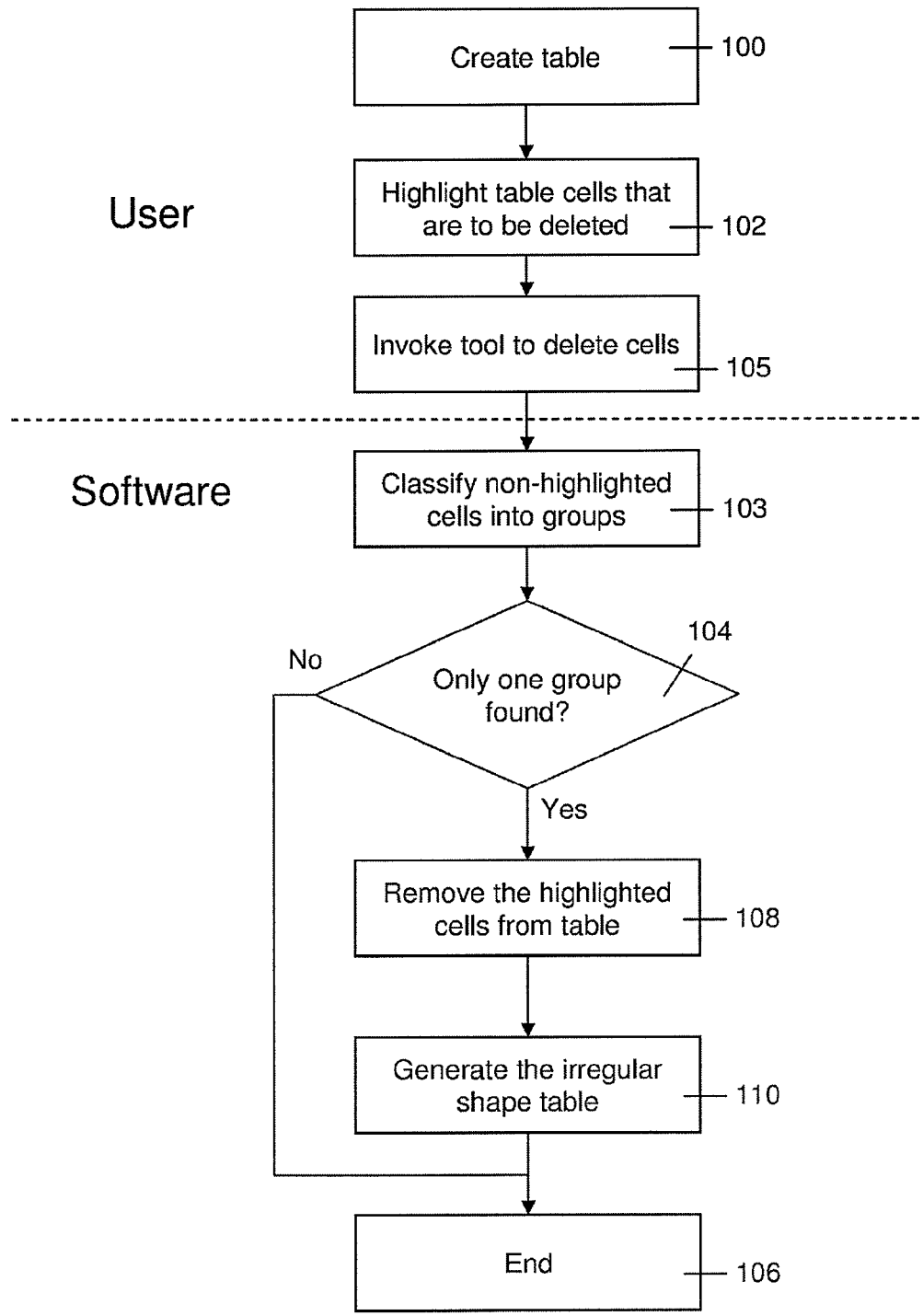
FIG. 4 is a flowchart showing the general steps performed during irregular-shaped table creation.

Turning now to FIG. 4, the general steps performed during irregular-shaped table creation are shown. As mentioned above, initially a regular-shaped table is created (step 100) and the cells of the regular-shaped table that are to be removed from that regular-shaped table to form the desired irregular-shaped table are highlighted (step 102). When the software tool for creating irregular-shaped tables is then invoked (step 105) to delete cells, the non-highlighted cells are classified into cell groups (step 103). If the non-highlighted cells are classified into more than one group (step 104) (which would occur if not all of the non-highlighted cells of the regular-shaped table are interconnected), the irregular-shaped table creation process is terminated and an irregular-shaped table is not generated. The process then ends at step 106. It will be understood that, in this situation, the highlighted cells have bisected the regular-shaped table into two (or more) isolated groups of non-highlighted cells that can only be defined by separate table objects. As a result, a single table object representing an irregular-shaped table cannot be formed.

Figure 5:
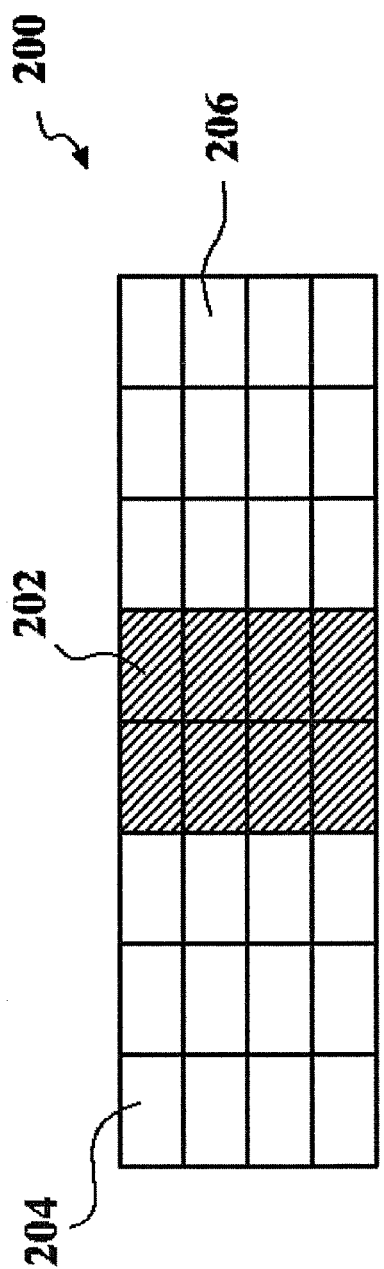
FIG. 5 shows a regular-shaped table with a group of selected highlighted cells that bisects the regular-shaped table.

To clearly illustrate such a situation, FIG. 5 shows a regular-shaped table 200 with a group of highlighted cells 202. In this case, the group of highlighted cells 202 bisects the table 200 resulting in more than one group of non-highlighted cells 204 and 206 respectively. As a result, a single table object representing a single irregular-shaped table could not be formed after removal of the group of highlighted cells 202 from the regular-shaped table 200.

Returning now to the flowchart shown in FIG. 4 if, at step 104, it is determined that the non-highlighted cells are classified into only one group the highlighted cells are removed from the table (step 108). A table object representing the resulting irregular-shaped table is then generated (step 110).

Figure 6A:
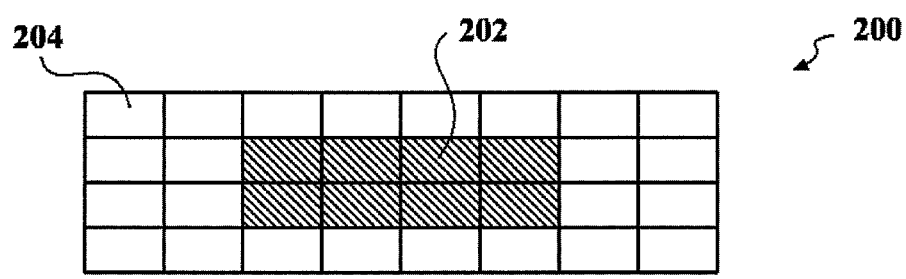
FIGS. 6a to 6c show regular-shaped tables, each with a group of selected highlighted cells that does not bisect the regular-shaped table.
Figure 6B:
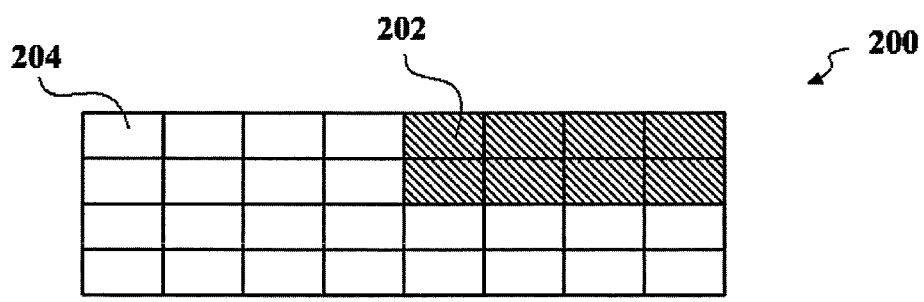
Figure 6C:
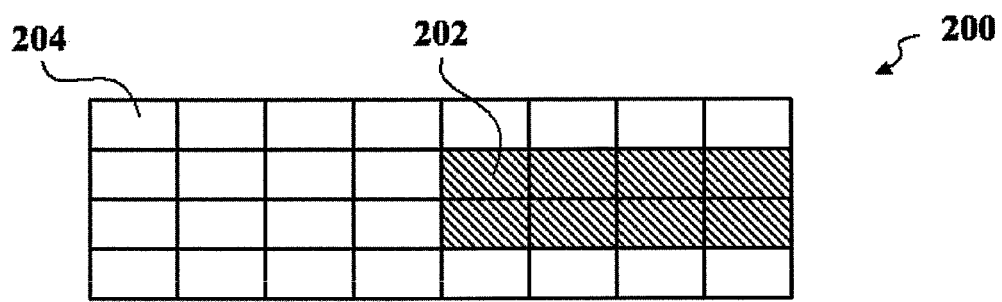
Figure 6D:
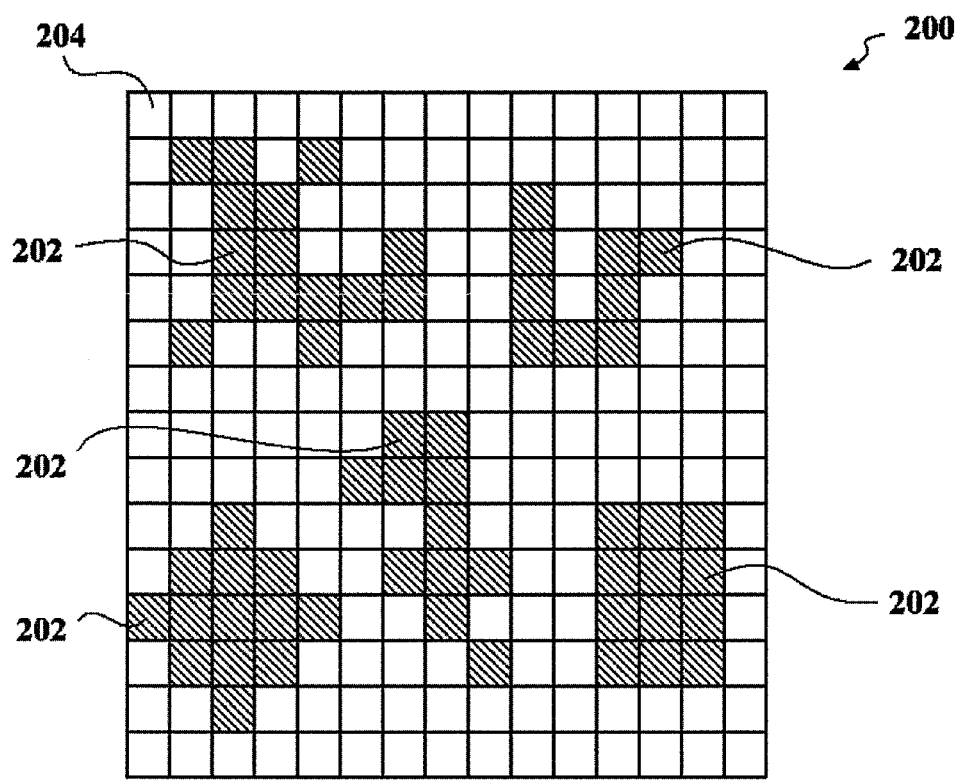
FIG. 6d shows a regular-shaped table with multiple groups of selected highlighted cells that do not bisect the regular-shaped table.

FIGS. 6a, 6b and 6c also show regular-shaped tables 200, each with a single group of highlighted cells 202. In each of these cases, the group of highlighted cells 204 does not bisect the table 200. As a result, the non-highlighted cells 204 of each table 200 are interconnected and thus a single table object representing an irregular-shaped table can be formed after the highlighted cells have been removed from the regular-shaped table 200 in each of the cases shown in FIGS. 6a to 6c. FIG. 6d shows a larger regular-shaped table 200, with multiple groups of highlighted cells 202. None of the groups of selected highlighted cells 204 bisects the table 200. As a result, the non-highlighted cells 204 of each table 200 are connected. Thus, a single table object representing each irregular-shaped table can be formed after the highlighted cells have been removed from the regular-shaped table 200.

Figure 7:
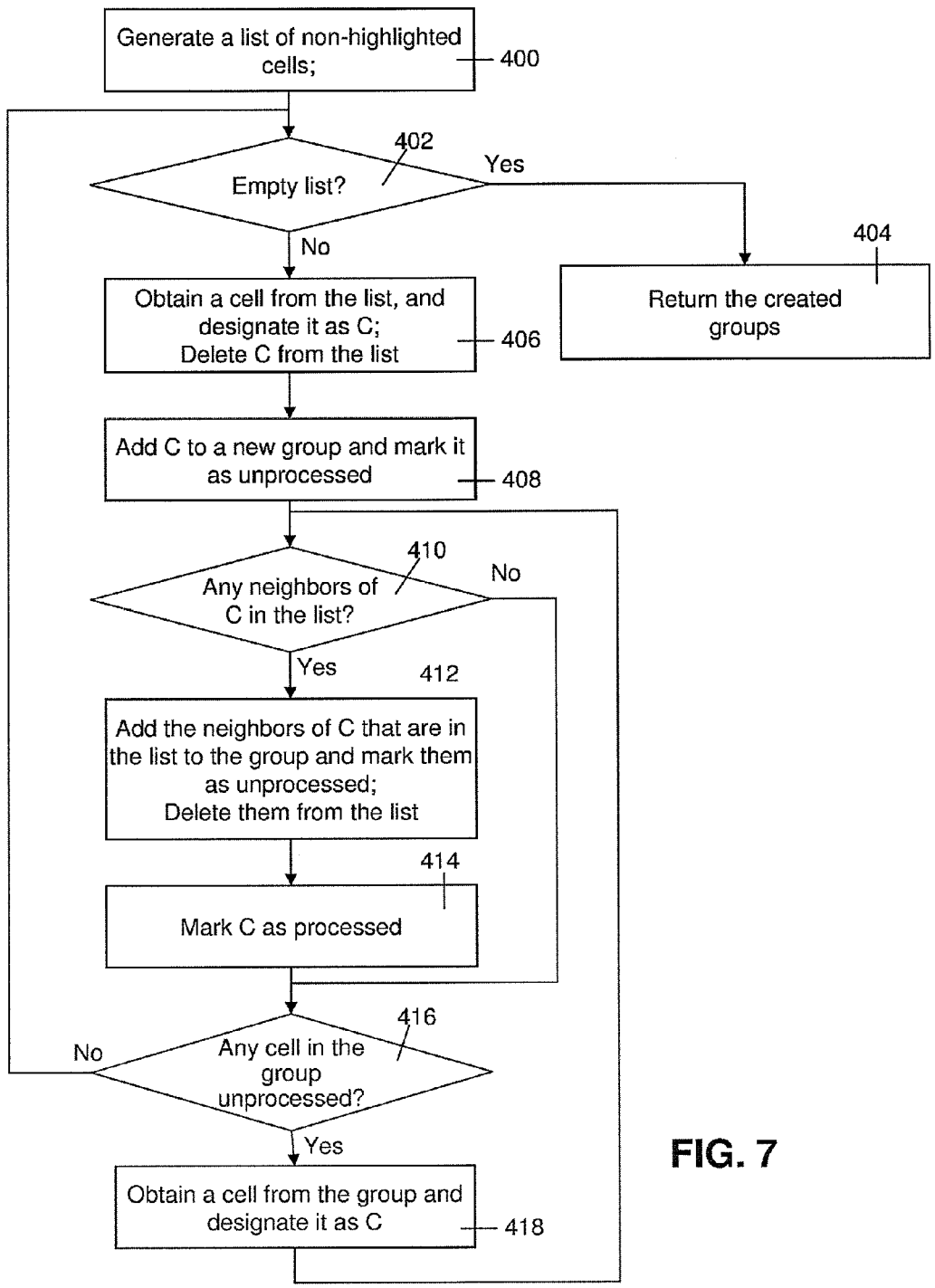
FIG. 7 is a flowchart showing the steps performed in order to classify non-highlighted cells into groups.

FIG. 7 shows in further detail the process for classifying non-highlighted cells into groups, as indicated more generally at step 103 of FIG. 4. Initially, the regular-shaped table is examined to generate a list of the non-highlighted cells (step 400). The list is then checked to determine if it is empty (step 402). If the list is empty, the created groups (or a null group if no group has been created) are returned (step 404). Otherwise, if the list is not empty, a first cell (designated as C) in the list is then selected, and removed from the list (step 402). In step 408, the cell C is added to a new group and marked as unprocessed. A check is then made to determine if any of the neighboring cells of C are in the list (step 410).

Figures 8A, 8B, 8C:
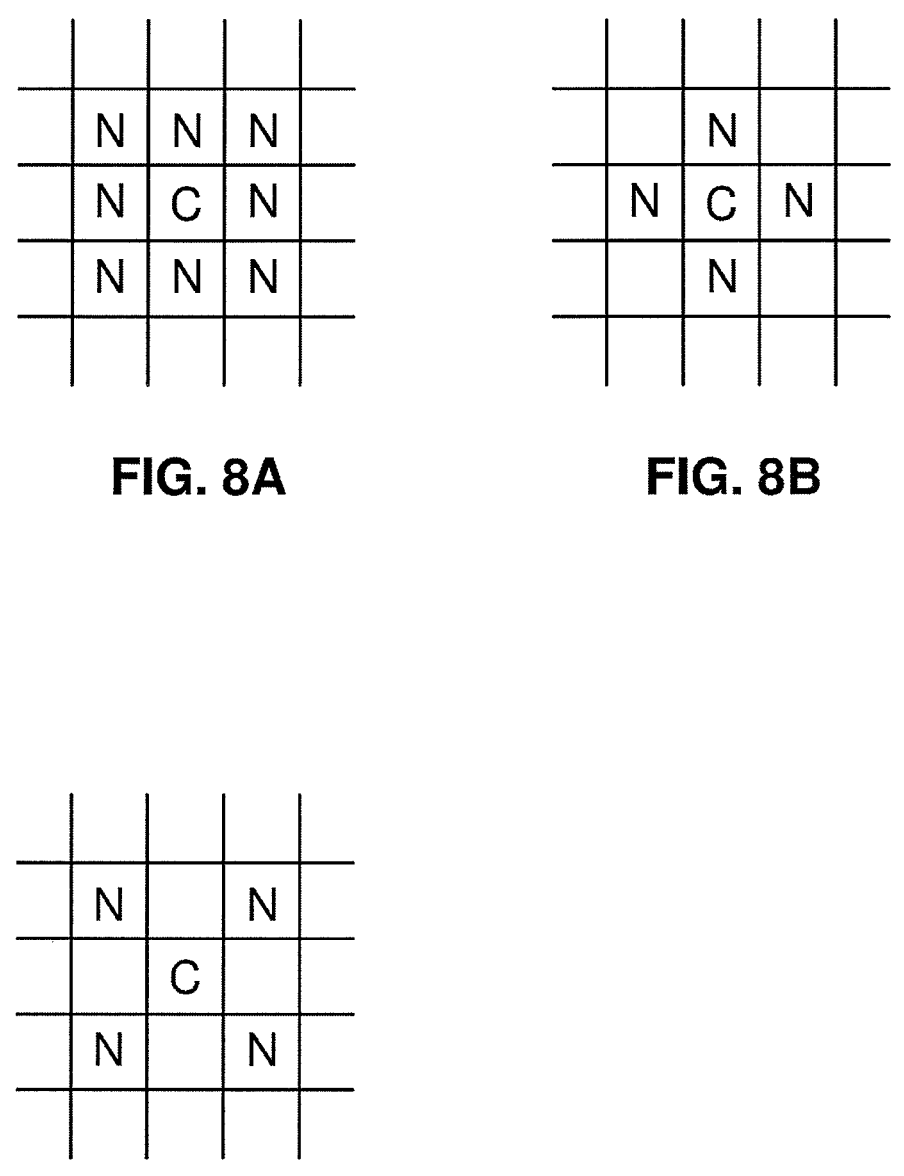

FIG. 8a illustrates the neighboring cells of a cell C according to one embodiment, where the eight cells marked as N share the same borders and/or corner points with C, and are defined as the neighboring cells of C. Other methods of defining neighboring cells N may be employed. For example, FIG.

8b illustrates the neighboring cells of a cell C according to an alternative embodiment, where the four cells marked as N share the same borders with C, and are defined as the neighboring cells of C. FIG. 8c illustrates the neighboring cells of a cell C according to another alternative embodiment, where the four cells marked as N share the same corner points but none of the same borders as C, and are defined as the neighboring cells of C. Those having skill in the art will appreciate that other definitions of the neighboring cells may be employed.

Returning now to the flowchart of FIG. 7, in step 410, if no cell in the list is the neighbor of C, a check is then made to determine if any unprocessed cells remain in the group (step 416). Otherwise, the cells in the list that are neighbors of C are added to the group, marked as unprocessed, and deleted from the list (step 412). In step 414, the cell C is marked as processed. Then, a check is then made to determine if any unprocessed cells remain in the group (step 416).

If all cells in the group are processed, the process reverts back to step 402 to check whether the list is empty. If the list is not empty, the next cell C in the list is obtained, and designated as C (step 406). The process then continues through to step 418 with the new cell C. However, if the list is empty, the created groups are returned (step 404).

Figure 9:
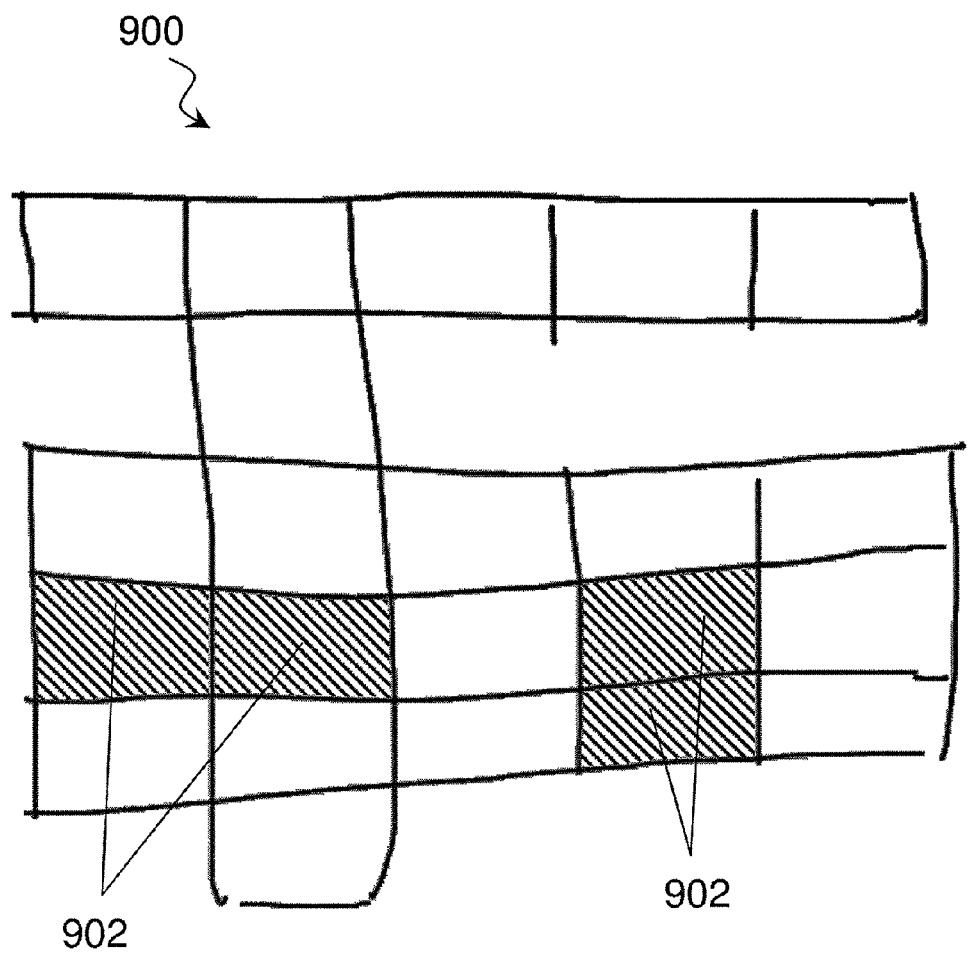
FIG. 9 shows a hand-drawn irregular-shaped table having selected highlighted cells.

In the embodiments described above, irregular-shaped tables are created from regular-shaped tables that have been generated using conventional software. However, irregular-shaped tables may also be created from hand-drawn table outlines that are either regular-shaped or irregular-shaped. FIG. 9 shows a table outline 900 having been hand-drawn, with a number of cells 902 having also been selected, as shown by the highlighting. The highlighted cells may all be connected and therefore form a single group of highlighted cells, or the highlighted cells may form multiple groups of highlighted cells. After the desired cells of the hand-drawn table outline 900 have been selected and highlighted, the user may cause the highlighted cells to be deleted, and then initiate recognition of the hand-drawn table outline as an irregular table object by selecting a displayed icon or an item in a pop-up menu.

Figure 10:
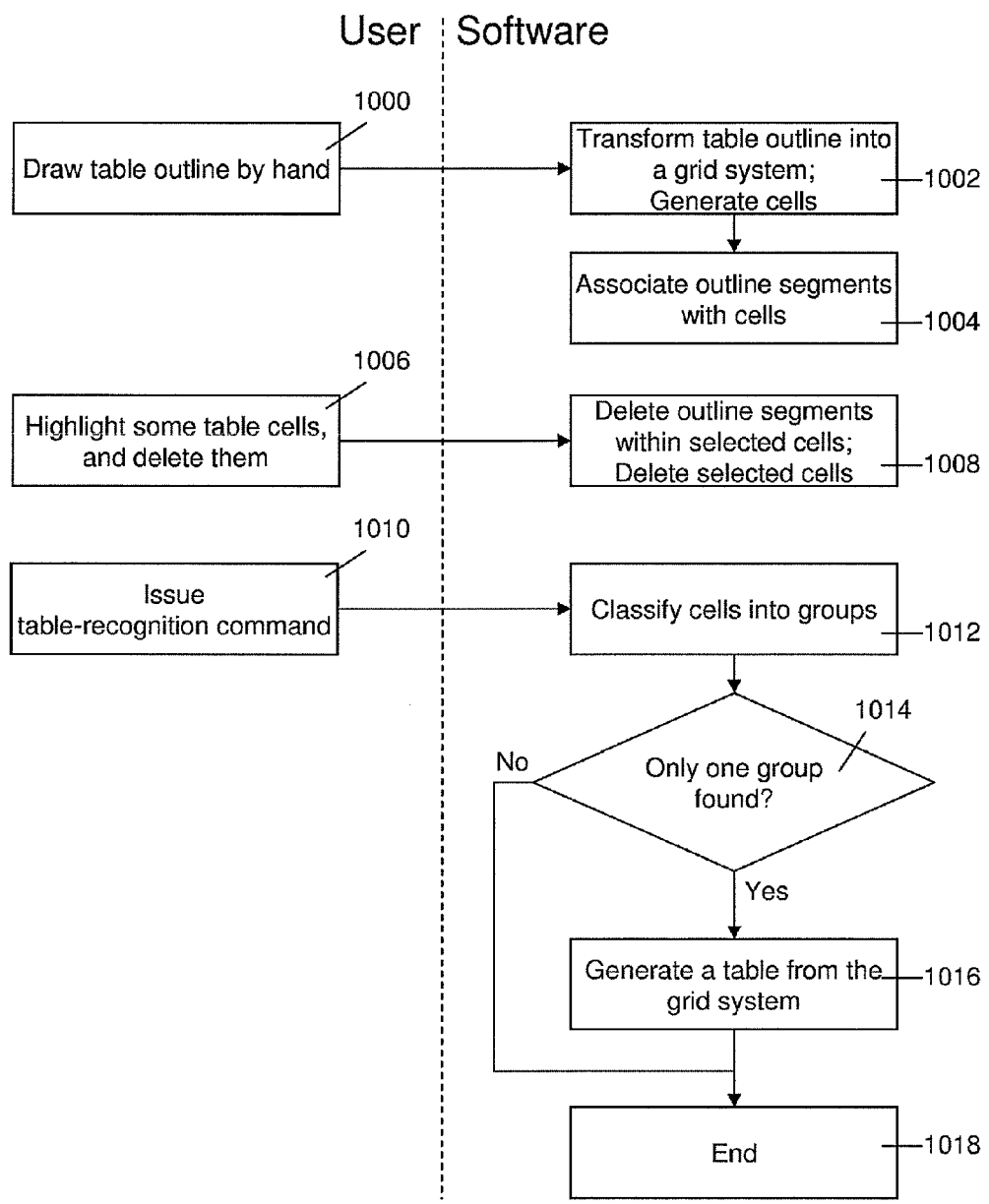
FIG. 10 is a flowchart showing general steps performed during hand-drawn irregular-shaped table creation.

FIG. 10 illustrates the process of creating a hand-drawn irregular-shaped table. First, user first draws a table outline by hand using, for example, a pointer (step 1000). The table outline may be regular-shaped or irregular-shaped. In step 1002, the hand-drawn table outline is automatically transformed to a grid system and cells are generated in the grid system according to the method described in U.S. patent application Ser. No. 12/058,234 to Zhaohui Xing filed on Mar. 28, 2008 entitled "Method and Tool for Recognizing a Hand-Drawn Table" and in U.S. CIP patent application Ser. No. 12/203,605 filed on Sep. 3, 2008 entitled "Method and Tool for Recognizing a Hand-Drawn Table", the contents of which are incorporated by reference herein in their entirety. Outline segments are then associated with cells in the grid system, and the user's further command is awaited (step 1004). If the user selects some table cells and issues the delete command (step 1006), the outline segments within the selected cells are deleted, as are the selected cells from the grid system (step 1008). Once the user issues the table-recognition command (step 1010), cells are classified in the grid system into groups as has been previously described (step 1012), and a check is then made to determine if the unselected cells form only one group (step 1014). If the unselected cells form more than one group, the process is terminated (step 1018) without completing the hand-drawn table recognition. However, if cells in the grid system form only one group, the hand-drawn table recognition is executed to generate a table object from the grid system (step 1016) using the method described in the above-mentioned U.S. patent application Ser. No. 12/058,234 and U.S. CIP patent application Ser. No. 12/203,605. The process terminates (step 1018) after the table object has been generated.

It will be understood that steps 1006 and 1008 described above are optional. That is, the user may or may not delete any cells from the table outline before issuing a table-recognition command.

In the embodiments described above, the selected cells to be removed from tables are described as being selected and then highlighted. Those of skill in the art will appreciate that other methods may be employed to designate the cells to be deleted. For example, cells to be deleted from a table may be designated by size, font etc.

Although the irregular-shaped table creation tool has been described with specific reference to its implementation in the SMART Notebook™ application, those of skill in the art will appreciate that the irregular-shaped table creation tool may be used as a stand alone tool or implemented as a feature in other digital ink software environments to facilitate the creation of table objects representing irregular-shaped tables.

The irregular-shaped table creation tool may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable media include for example read-only memory (ROM), random-access memory (RAM), flash memory, CD-ROMs, magnetic tape, optical data storage devices and other storage media. The computer readable program code can also be distributed over a network including coupled computer systems so that the computer readable program code is stored and executed in a distributed fashion or copied over a network for local execution.

Although embodiments have been described with reference to the drawings, those of skill in the art will appreciate that variations and modifications may be made without departing from the spirit and scope thereof as defined by the appended claims.

What is claimed is:

1. A method executed by a processing device for creating an irregular-shaped table object comprising a group of cells, said method comprising:

receiving touch input entered on an interactive display representing a hand-drawn table;

detecting one or more hand-drawn cells of the hand-drawn table presented on the interactive display that are to be removed;

modifying said hand-drawn table by removing each detected hand-drawn cell from said hand-drawn table to create a resultant irregular-shaped hand-drawn table object; and creating an irregular-shaped table object based on the resultant irregular-shaped hand-drawn table in response to an issued table recognition command, wherein removal of each detected hand-drawn cell from said hand-drawn table does not affect any of the remaining cells of the hand-drawn table regardless of the location of the detected hand-drawn cell in said hand-drawn table that is removed, wherein the hand-drawn cells to be removed are user designated cells, wherein said detecting comprises:

generating a list of all cells that have not been designated by the user;

selecting one of the cells in said list, removing the selected cell from said list and adding the selected cell to a first group of cells;

identifying cells neighboring the selected cell added to the first group of cells, removing the identified neighboring cells from said list and adding the identified neighboring cells to said first group of cells;

for each identified neighboring cell added to the first group of cells, identifying neighboring cells in said list, removing the identified neighboring cells from said list, and adding the identified neighboring cells to said first group of cells;

repeating the identifying, removing and adding steps for each identified neighboring cell added to said first group of cells;

upon completion of said repeating, determining whether said list still comprises one or more cells that have not been designated by the user; and only when said list does not comprise any cells that have not been designated by the user, performing said removing.

2. The method of claim 1 wherein the hand-drawn cells to be removed are made to be visually distinct from cells that are not to be removed.

3. The method of claim 2 further comprising highlighting the user designated hand-drawn cells to be removed.

4. The method of claim 1 wherein said detecting comprises determining one or more groups of designated hand-drawn cells of said hand-drawn table to be removed.

5. The method of claim 4 wherein each group of designated hand-drawn cells comprises either one cell or a plurality of interconnected cells.

6. The method of claim 1 wherein said user designated hand-drawn cells are removed only when all other cells of said hand-drawn table are interconnected.

7. The method of claim 6 further comprising highlighting the user designated hand-drawn cells to be removed.

8. The method of claim 1 further comprising highlighting the user designated hand-drawn cells to be removed.

9. The method of claim 1 wherein said identifying comprises identifying cells that share a corner or border.

10. A non-transitory computer readable medium embodying computer program code, said computer program code when executed by processing structure creating an irregular-shaped table object comprising a group of cells for presentation on an interactive display, said computer program code comprising:

program code for receiving touch input entered on said interactive display representing a hand-drawn table;

program code for detecting one or more hand-drawn cells of the hand-drawn table presented on said interactive display that are to be removed;

program code for modifying said hand-drawn table by removing each detected hand-drawn cell from said displayed hand-drawn table to create a resultant irregular-shaped hand-drawn table; and program code for creating an irregular-shaped table object based on the resultant irregular-shaped hand-drawn table in response to an issued table recognition command, wherein removal of each detected hand-drawn cell from said hand-drawn table does not affect any of the remaining cells of the hand-drawn table regardless of the location of the detected hand-drawn cell in said hand-drawn table that is removed, wherein the hand-drawn cells to be removed are user designated cells, wherein said detecting comprises:

generating a list of all cells that have not been designated by the user;

selecting one of the cells in said list, removing the selected cell from said list and adding the selected cell to a first group of cells;

identifying cells neighboring the selected cell added to the first group of cells, removing the identified neighboring cells from said list and adding the identified neighboring cells to said first group of cells;

for each identified neighboring cell added to the first group of cells, identifying neighboring cells in said list, removing the identified neighboring cells from said list, and adding the identified neighboring cells to said first group of cells;

repeating the identifying, removing and adding steps for each identified neighboring cell added to said first group of cells;

upon completion of said repeating, determining whether said list still comprises one or more cells that have not been designated by the user; and only when said list does not comprise any cells that have not been designated by the user, performing said removing.

11. An interactive input system comprising:

an interactive display device; and processing structure communicating with said interactive display device, said processing structure being configured to:

receive touch input entered on said interactive display device representing a hand-drawn table comprising a group of hand-drawn cells;

detect one or more hand-drawn cells of said hand-drawn table presented on said interactive display device that are to be deleted;

delete each detected hand-drawn cell from said hand-drawn table to create an irregular-shaped hand-drawn table; and create an irregular-shaped table object based on the irregular-shaped hand-drawn table in response to an issued table recognition command, wherein deletion of each detected hand-drawn cell from said hand-drawn table does not affect any of the remaining cells of the hand-drawn table regardless of the location of the detected hand-drawn cell in said hand-drawn table that is deleted, wherein said interactive display device, in response to user input, designates the hand-drawn cells of said hand-drawn table to be deleted, wherein the processing structure, in order to detect the one or more hand-drawn cells to be deleted, is configured to:

generate a list of all cells that have not been designated by the user;

select one of the cells in said list, remove the selected cell from said list and add the selected cell to a first group of cells;

identify cells neighboring the selected cell added to the first group of cells, remove the identified neighboring cells from said list and add the identified neighboring cells to said first group of cells;

for each identified neighboring cell added to the first group of cells, identify neighboring cells in said list, remove the identified neighboring cells from said list, and add the identified neighboring cells to said first group of cells;

repeat the identifying, removing and adding for each identified neighboring cell added to said first group of cells;

upon completion of said repeating, determine whether said list still comprises one or more that have not been designated by the user cells; and only when said list does not comprise any cells that have not been designated by the user, perform said deleting.

12. The interactive input system of claim 10 wherein said processing structure is configured to identify neighboring cells as cells that share a corner or border.

13. The interactive input system of claim 10 wherein the processing structure is further configured to determine one or more groups of designated cells hand-drawn of said hand-drawn table to be deleted.

14. The interactive input system of claim 13 wherein each group of designated hand-drawn cells comprises either one cell or a plurality of interconnected cells.

15. The interactive input system of claim 11 wherein said user designated hand-drawn cells are deleted only when all other cells of said hand-drawn table are interconnected.

* * * * *